(12) United States Patent
Chae et al.

(10) Patent No.: US 10,991,103 B2
(45) Date of Patent: Apr. 27, 2021

(54) METHOD FOR EXTRACTING PERSON REGION IN IMAGE AND APPARATUS USING THE SAME

(71) Applicant: ELECTRONICS AND TELECOMMUNICATIONS RESEARCH INSTITUTE, Daejeon (KR)

(72) Inventors: Won Seok Chae, Seoul (KR); Hyeon Jin Kim, Anyang-si (KR); Soo Myung Park, Seoul (KR); Ah Reum Oh, Cheongju-si (KR); Ha Lim Choi, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/656,829

(22) Filed: Oct. 18, 2019

(65) Prior Publication Data

US 2020/0250830 A1 Aug. 6, 2020

(30) Foreign Application Priority Data

Feb. 1, 2019 (KR) ........................ 10-2019-0013781

(51) Int. Cl.
| | |
|---|---|
| *G06T 7/155* | (2017.01) |
| *G06K 9/00* | (2006.01) |
| *G06T 7/194* | (2017.01) |
| *G06T 7/11* | (2017.01) |
| *G06T 7/12* | (2017.01) |

(52) U.S. Cl.
CPC .......... *G06T 7/155* (2017.01); *G06K 9/00228* (2013.01); *G06T 7/11* (2017.01); *G06T 7/12* (2017.01); *G06T 7/194* (2017.01); *G06T 2207/20152* (2013.01); *G06T 2207/30201* (2013.01)

(58) Field of Classification Search
CPC .................................................. G06K 9/00228
See application file for complete search history.

(56) References Cited

U.S. PATENT DOCUMENTS

| 9,438,769 B1 | 9/2016 | Fan |
|---|---|---|
| 2009/0097717 A1 | 4/2009 | Chung et al. |

(Continued)

FOREIGN PATENT DOCUMENTS

| KR | 10-1015671 B1 | 2/2011 |
|---|---|---|
| KR | 10-1799680 B1 | 11/2017 |

(Continued)

*Primary Examiner* — Edward Park
(74) *Attorney, Agent, or Firm* — LRK Patent Law Firm

(57) ABSTRACT

A method for extracting a person region includes detecting a face from a raw image input in real time; configuring a search range based on the detected face; extracting an outline of a person region by performing preprocessing on an image within the search range; configuring watershed markers on a background and a foreground of the image within the search range based on the extracted outline; performing a watershed transform based on the configured watershed markers; and separating the person region from the raw image using a result of the watershed transform.

12 Claims, 3 Drawing Sheets

(56) References Cited

U.S. PATENT DOCUMENTS

| | | | |
|---|---|---|---|
| 2009/0290791 A1* | 11/2009 | Holub | G06K 9/00234 |
| | | | 382/164 |
| 2009/0290795 A1 | 11/2009 | Criminisi et al. | |
| 2010/0158325 A1 | 6/2010 | Piramuthu et al. | |
| 2013/0009989 A1 | 1/2013 | Chen et al. | |
| 2013/0223693 A1* | 8/2013 | Chamberlain | G06T 7/0004 |
| | | | 382/110 |
| 2013/0236099 A1 | 9/2013 | Yu et al. | |
| 2013/0308856 A1* | 11/2013 | Carpenter | G06K 9/00335 |
| | | | 382/164 |
| 2016/0012611 A1* | 1/2016 | Wexler | G06T 7/62 |
| | | | 382/103 |
| 2016/0100152 A1* | 4/2016 | Park | G06T 7/174 |
| | | | 382/154 |
| 2016/0194779 A1* | 7/2016 | Umemoto | B29C 70/683 |
| | | | 428/307.3 |
| 2017/0262984 A1* | 9/2017 | Barnes | G06T 7/11 |
| 2018/0184171 A1* | 6/2018 | Danker | H04N 21/4788 |
| 2020/0250830 A1* | 8/2020 | Chae | G06T 7/11 |

FOREIGN PATENT DOCUMENTS

| | | |
|---|---|---|
| KR | 10-1837026 B1 | 3/2018 |
| KR | 10-2018-0099026 A | 9/2018 |

\* cited by examiner

METHOD FOR EXTRACTING PERSON REGION IN IMAGE AND APPARATUS USING THE SAME

CROSS-REFERENCE TO RELATED APPLICATION

This application claims priority to Korean Patent Application No. 10-2019-0013781 filed on Feb. 1, 2019 with the Korean Intellectual Property Office (KIPO), the entire content of which is hereby incorporated by reference.

BACKGROUND

1. Field of the Invention

The present disclosure relates generally to a method for extracting a person region from an image, an image processing apparatus using the same, and a system using the same, and more specifically, to a watershed-based method for extracting a person region from an image, an image processing apparatus using the same, and a system using the same.

2. Description of Related Art

In the videoconferencing market or the video call market, there is an increasing demand to remove a user's background and transmit other conference and video data simultaneously. The function of removing a background from a certain image and transmitting the image is important for users working in research or defense facilities where it is required for the users not to expose a space in which they are located.

As such, in order to remove a background from a given image and extract only a target object, technical elements such as segmentation, tracking, and depth information extraction are required. However, when a user wants to perform a video conference in real time simply by using a user's mobile device, technical difficulties may arise due to a problem that a depth camera is basically mounted only on a rear part of the mobile device.

That is, it is very challenging to remove a background and extract only a person region by processing a video image input from a general camera (i.e., front camera) in a front part of the mobile device, which cannot obtain depth information in real time on the mobile device having relatively poor computing performance.

On the other hand, a method of solving this problem by using the latest advanced deep learning technology may be considered. In fact, it is being used in the field of video segmentation by improving artificial intelligence to be able to learn and operate on the mobile device. However, these solutions require extensive prior learning (i.e., training), which requires a great deal of resources and effort to prepare data for the learning. Also, there is a difficulty in understanding internal workings of the artificial intelligence, which makes it difficult to solve problems that need to be considered in order to improve results.

SUMMARY

Accordingly, exemplary embodiments of the present disclosure provide a method for extracting a person region by using a marker-based watershed transform scheme.

Also, exemplary embodiments of the present disclosure provide an image processing apparatus using the above-described method for extracting a person region.

Also, exemplary embodiments of the present disclosure provide a system using the above-described method for extracting a person region.

According to an exemplary embodiment of the present disclosure, a method for extracting a person region, performed by a portable terminal, may comprise detecting a face from a raw image input in real time; configuring a search range based on the detected face; extracting an outline of a person region by performing preprocessing on an image within the search range; configuring watershed markers on a background and a foreground of the image within the search range based on the extracted outline; performing a watershed transform based on the configured watershed markers; and separating the person region from the raw image using a result of the watershed transform.

The separating of the person region may comprise separating the person region from the image within the search range by using the result of the watershed transform as a mask.

The raw image may be input from an image acquisition device, and the image acquisition device may be a front camera of the portable terminal.

The method may further comprise displaying the separated person region.

The extracting of the outline of the person region may comprise converting the image within the search range into a black and white image; performing a binarization transform on the converted black and white image; calculating a distance transform matrix for the binarized transformed image; and extracting the outline of the person region using the distance transform matrix.

The extracting of the outline of the person region may further comprise applying an image dilation filter based on a result of calculating the distance transform matrix; and removing an outline of an object smaller than a predetermined size from the extracted outline.

Furthermore, according to an exemplary embodiment of the present disclosure, an apparatus for extracting a person region from an input image may comprise a processor and a memory storing at least one instruction executable by the processor. When executed by the processor, the at least one instruction may be configured the processor to detect a face from a raw image input in real time; configure a search range based on the detected face; extract an outline of a person region by performing preprocessing on an image within the search range; configure watershed markers on a background and a foreground of the image within the search range based on the extracted outline; perform a watershed transform based on the configured watershed markers; and separate the person region from the raw image using a result of the watershed transform.

The at least one instruction may be further configured the processor to separate the person region from the image within the search range by using the result of the watershed transform as a mask.

The raw image may be input from an image acquisition device, and the image acquisition device may be a front camera of the portable terminal.

The at least one instruction may be further configured the processor to display the separated person region.

The at least one instruction may be further configured the processor to convert the image within the search range into a black and white image; perform a binarization transform on the converted black and white image; calculate a distance transform matrix for the binarized transformed image; and extract the outline of the person region using the distance transform matrix.

The at least one instruction may be further configured the processor to apply an image dilation filter based on a result of calculating the distance transform matrix; and remove an outline of an object smaller than a predetermined size from the extracted outline.

Furthermore, according to an exemplary embodiment of the present disclosure, a system for extracting a person region may comprise an image acquisition device acquiring a raw image in real time, the raw image including a target person and a background; an image processing device detecting a face from the raw image input from the image acquisition device in real time; configuring a search range based on the detected face; extracting an outline of a person region of the target person by performing preprocessing on an image within the search range; configuring watershed markers on the background and a foreground of the image within the search range based on the extracted outline; performing a watershed transform based on the configured watershed markers; and separating the person region from the raw image using a result of the watershed transform; and an image display device displaying the separated person region.

The image processing device may separate the person region from the image within the search range by using the result of the watershed transform as a mask.

The image acquisition device may be a front camera of the portable terminal.

The image processing device may convert the image within the search range into a black and white image; perform a binarization transform on the converted black and white image; calculate a distance transform matrix for the binarized transformed image; and extract the outline of the person region using the distance transform matrix.

The image display device may display the separated person region and a background region different from the background of the raw image.

According to the exemplary embodiments of the present disclosure as described above, a foreground region (i.e., person region) can be extracted by processing a video image input through a front camera of a conventional portable terminal in real time without additional hardware. Also, the exemplary embodiments of the present disclosure can effectively extract the foreground region even when the user moves with the portable terminal in his hand.

BRIEF DESCRIPTION OF DRAWINGS

Embodiments of the present disclosure will become more apparent by describing in detail embodiments of the present disclosure with reference to the accompanying drawings, in which.

Figure 1:
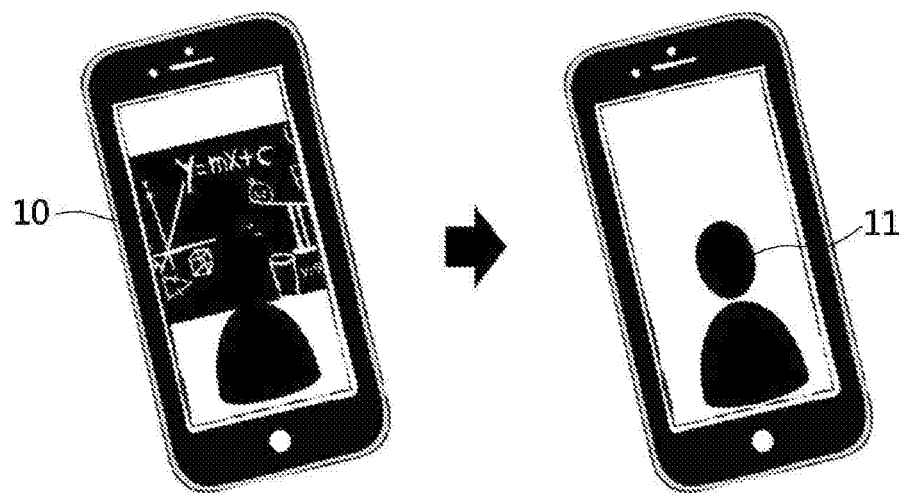
FIG. 1 is a conceptual diagram for explaining a method for extracting a person region according to an exemplary embodiment of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The term 'video' or 'image' is used herein in the same or similar sense, and the video or image is a concept including a still image or a video. Also, the video or the image may be used as a term referring to an entire picture, an entire frame, or a part thereof.

The present disclosure is directed to providing a method and an apparatus for removing a background from a video image obtained from a front camera of a smart device (e.g., portable terminal such as a smart phone) and extracting a foreground which is a person region of a user.

In exemplary embodiments of the present disclosure, a scheme of fixing the position and orientation of the camera and analyzing a background in advance in absence of a subject is not used. That is, according to exemplary embodiments of the present disclosure, the foreground can be extracted in real time while the user moves with the terminal in his hand.

Further, exemplary embodiments of the present disclosure can extract the foreground by processing video images obtained from a general front camera for a video call or a self-mode shooting in real time on a smart device without using any additional hardware such as multiple cameras or a sensor capable of recognizing 3D depth information.

Hereinafter, exemplary embodiments of the present disclosure will be described in detail with reference to the accompanying drawings.

FIG. 1 is a conceptual diagram for explaining a method for extracting a person region according to an exemplary embodiment of the present disclosure.

Referring to FIG. 1, according to an exemplary embodiment of the present disclosure, a background may be removed from an image 10 of a target person, which is acquired from a front camera of a smart device, without any user intervention, and a foreground 11, which is the person region, may be extracted and provided to a screen of the smart device.

Here, the person region, for example, may not only include a face of the target person but also include other body regions of the person such as hair and torso.

In order to remove a background from an input image, segmentation techniques are usually required. The image segmentation techniques have been studied for a long time in a field of computer vision as techniques for segmenting a digital image given as an input into a number of segments, or sets of pixels. The reason for using the segmentation is to segment the input image into meaningful regions and use them for various purposes. In particular, the technique of separating a background region and a person region corresponding to a foreground region from a portrait picture is being widely used for changing the background of the picture to another image.

When a video, i.e. a series of consecutive images, is inputted, separating a person region and a background region requires a fast processing technique in that the amount of data given is much larger. In this reason, a method of re-utilizing information obtained from a previous frame image is commonly used. Accordingly, in the field of video segmentation, a tracking technique that usually calculates and utilizes specific information such as a position of a human face in every frame is used together with the segmentation technique.

Of course, there is a technique that separates the person region from the background region by using information on the background already taken, but to do this, it is necessary to fix a camera, analyze only the background without a subject, and extract the foreground. Therefore, such the method is inconvenient to use in that there is a limitation that the camera cannot be moved, the function cannot be immediately used, and a preliminary work is required. If a person region can be extracted by processing a video image at the same time as shooting, a mobile service such as a video call or a video conference can provide a function of changing the background region to another image.

Recently, a depth camera, which is a device that can detect depth information of a subject using two or more cameras or infrared rays, is basically installed in a smart device so as to add a sense of depth to a portrait picture, or to easily get 3D information (3D model data) of an object. This function may be used directly to remove a background from an input image and extract only a person region. Therefore, in order to utilize depth information, there is a method of separately purchasing a peripheral device such as the depth camera and using it in addition to the smart device in use. However, since a smart device equipped with such the dedicated hardware only at a rear part instead of a front part is usually released, it may be difficult to use the depth camera for a service for removing a background from an image acquired for a user using a portable terminal such as a smartphone. Also, such the additional hardware may increase the price of the device or burden additional purchase.

In a mobile device having relatively low computing power, it is not technically easy to remove a background and extract only a person region by processing a video image input by a general front camera in which depth information cannot be easily obtained. To this end, a method of lowering a resolution of an image given as an input or converting the image to a black and white image first may be used to obtain a first low resolution result and to provide an improved result for successive frames. Thus, a basic scheme may be configured to include detailed steps such as low resolution foreground extraction, characteristic element tracking, quality improvement, and the like.

However, the results of most conventional techniques for obtaining real-time performance have a disadvantage of poor quality, such as providing an incorrect result when an outline of extracted foreground region is not smooth or a complex background is targeted. In addition, there is a technical problem that they are not vulnerable to light changes or they cannot properly remove a moving background according to movement of the camera.

On the contrary, exemplary embodiments of the present disclosure do not use the method of fixing the position and the direction of the camera, analyzing the background in the absence of the subject, and using the obtained information. That is, they can effectively extract and provide a foreground even when the user moves with the terminal in hand.

Also, the exemplary embodiments of the present disclosure can extract a foreground region by processing a video image obtained from a general front camera for a video call or a self-mode shooting in real time without using additional hardware such as multiple cameras or sensors capable of recognizing 3D depth information.

Figure 2:
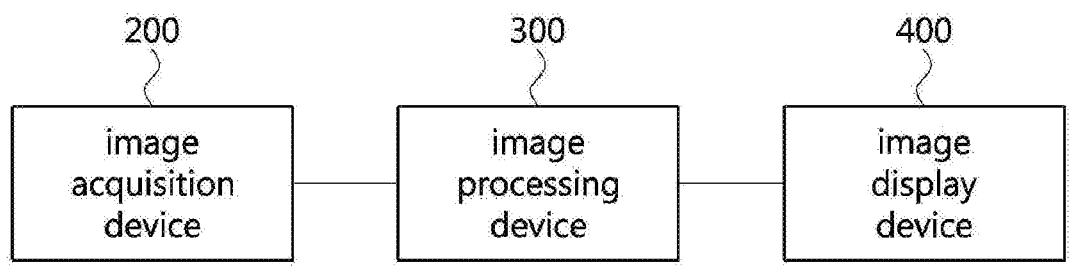
FIG. 2 is a block diagram illustrating a system for extracting a person region according to an exemplary embodiment of the present disclosure.

FIG. 2 is a block diagram illustrating a system for extracting a person region according to an exemplary embodiment of the present disclosure.

Referring to FIG. 2, a system for extracting a person region according to an exemplary embodiment of the present disclosure may comprise an image acquisition device 200 acquiring a raw image in real time, the raw image including a target person and a background; an image processing device 300 detecting a face from the raw image input from the image acquisition device in real time; configuring a search range based on the detected face; extracting an outline of a person region of the target person by performing preprocessing on an image within the search range; configuring watershed markers on the background and a foreground of the image within the search range based on the extracted outline; performing a watershed transform based on the configured watershed markers; and separating the person region from the raw image using a result of the watershed transform; and an image display device 400 displaying the separated person region.

Specifically, the image acquisition device 200 may acquire a general image including a target person and a background, which are considered in the method for extracting a person region according to the present disclosure. The image acquisition device 200 preferably may have a structure capable of photographing the same direction as the direction output by the image display device 400. For example, it may be a general digital camera or camcorder, or a general front camera mounted on a portable terminal. The image acquisition device 200 may provide an image acquired by photographing a background and a person (e.g., user) to the image processing device 300.

The image processing device 300 may receive a raw image (or, video) from the image acquisition device 200, and extract image information of a person region of the user by processing the raw image and removing a background from the raw image. The image processing device 300 may be implemented as a hardware or software module mounted in the portable terminal possessed by the user.

The image information on the person region, which is extracted by the image processing device 300, may be provided to the image display device 400. On the other hand, instead of provision of the image information, the image processing device 300 may perform only basic processing (e.g., noise removal) on the raw image acquired by the image acquisition device 200, and output the basic processed image to the image display device 400 as it is.

The image display device 400 may output the image or the basic processed image of the person region, which is received from the image processing device 300. The image display device 400 may add a third image as a background in addition to the image of the person region received from the image processing device 300 and simultaneously output the image information of the extracted person region together with the third image.

In FIG. 1, a case where the image acquisition device, the image processing device, and the image display device are implemented on a single smart device is illustrated. Various exemplary embodiments of the present disclosure may include a case where the image acquisition device, the image processing device, and the image display device are implemented on a single device and a case where each of the devices is implemented as a separate device. It may of course also include a case where two devices are implemented on one hardware device.

For example, the image acquisition device and the image processing device may be implemented on one piece of hardware, and only the image display device may be implemented on separate hardware. The image processing device and the image display device may be configured to communicate through a communication network so that the image display device receives and displays data about an image processed by the image processing device, that is, a foreground extracted from the image.

When the image display device is not mounted in the same hardware as the image acquisition device and the image processing device, the image encoded into a bit stream by the image processing device may be transmitted to the image display device in real-time or non-real-time through a wired or wireless communication network such as Internet, local area wireless communication network, wireless LAN network, WiBro network, and mobile communication network, or through various communication interfaces such as a cable and a universal serial bus (USB). The image display device may decode and reconstruct the encoded image, and reproduce the reconstructed image.

The image acquisition device, the image processing device, or the image display device may be mounted on a user terminal such as personal computer (PC), a notebook computer, a personal digital assistant (PDA), a portable multimedia player (PMP). a PlayStation Portable (PSP), a wireless communication terminal, and a smart phone. Such the user terminal may include a communication device such as a communication modem for performing communication with a wired/wireless communication network, a memory for storing various programs and data, and a microprocessor performing operations and controls by executing the program.

Figure 3:
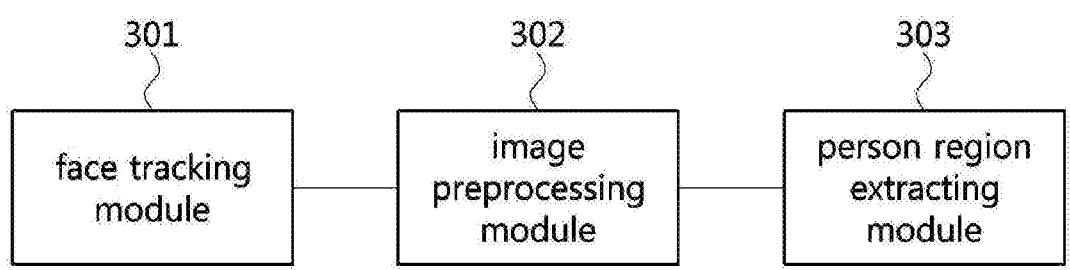
FIG. 3 is a block diagram illustrating an image processing device according to an exemplary embodiment of the present disclosure.

FIG. 3 is a block diagram illustrating an image processing device according to an exemplary embodiment of the present disclosure.

As shown in FIG. 3, an image processing device according to an exemplary embodiment of the present disclosure may include a face tracking module 301, an image preprocessing module 302, and a person region extracting module 303.

The face tracking module 301 may determine whether a face of a person exists in an image given as an input, and calculate a position and a size of the face when the face exists in the corresponding image. In an exemplary embodiment of the present disclosure, since the real-time input image obtained by the camera is handled, the position and size of the human face may be updated every image frame in a series of image sequences continuously input.

In the present disclosure, in the process of detecting the face of the person, no user intervention, such as a user's screen touch input, is required, and the position of the face may be automatically detected. In addition, the present disclosure is not limited to a specific method for detecting the position and size of the face of the person with respect to an image photographed with the camera.

The face tracking module 301 may determine presence or absence of a face of a person every frame from the continuously provided images, and provide the image preprocessing module 302 with the position and size information when the face exists.

The image preprocessing module 302 may be responsible for an image processing function as preprocessing to improve speed and quality performance of the person region extracting module 303. For example, the image preprocessing module 302 may convert a high resolution image obtained through the image acquisition device into a low resolution image, or convert an image obtained as a color image into a black and white image.

The person region extracting module 303 that receives the preprocessed image from the image preprocessing module 302 may extract a person region from the entire image using a watershed-based algorithm. The watershed-based algorithm is a scheme of recognizing each pixel value in the image as an elevation, and analyzing the elevations by considering a set of pixels as a two-dimensional terrain. That is, it is an algorithm that recognizes a puddle surrounded by a contour when filled with water as a segmented region. The watershed-based algorithm is a scheme for expanding a watershed by gradually increasing the height of the water from the lowest level. When different watersheds come into contact with each other, the watersheds may be segmented or new watersheds may be formed by building up virtual dams. Therefore, the watershed-based algorithm may be used to separate objects in a noisy environment based on the similarity of contrast between the respective pixels of the image.

The input image of the watershed transform may not use the raw color image, but use a matrix having gradient values as defined in Equation 1 below.

$$|grad\, g(x, y)| = \sqrt{\left(\frac{\partial g}{\partial x}\right)^2 + \left(\frac{\partial g}{\partial y}\right)^2} \quad \text{[Equation 1]}$$

In Equation 1, (x, y) is a coordinate or a position value of a pixel.

In the watershed transform, the gradient value of each image pixel calculated according to Equation 1 may be used as topographic elevation information. The key concept of the Watershed transform is to calculate a 'watershed line' where water starts to rise at minimum points of all elevations and the water originating from different minimum points meet. The watershed line calculated in this way may be used to derive outlines of the objects included in the image. This scheme may enable real-time image processing even in mobile devices having relatively poor performance.

In an exemplary embodiment of the present disclosure, among various watershed transform algorithms, a marker-based watershed transform scheme, which is resistant to noises and can utilize previously acquired information to quickly calculate a high-quality foreground region using the position and size information of the face already calculated, may be used.

More specifically, an exemplary embodiment of the present disclosure uses a distance transform matrix when generating the markers. The watershed transform based on the distance transform matrix may be helpful to separate rounded objects. The watershed transform has a property of creating continuous outlines as far from centers of the objects as possible. The distance transform matrix may be helpful to achieve such the advantage as much as possible. That is, the distance transform matrix is useful for creating watershed markers of the foreground and background that vary continuously from the center of each object.

Figure 4:
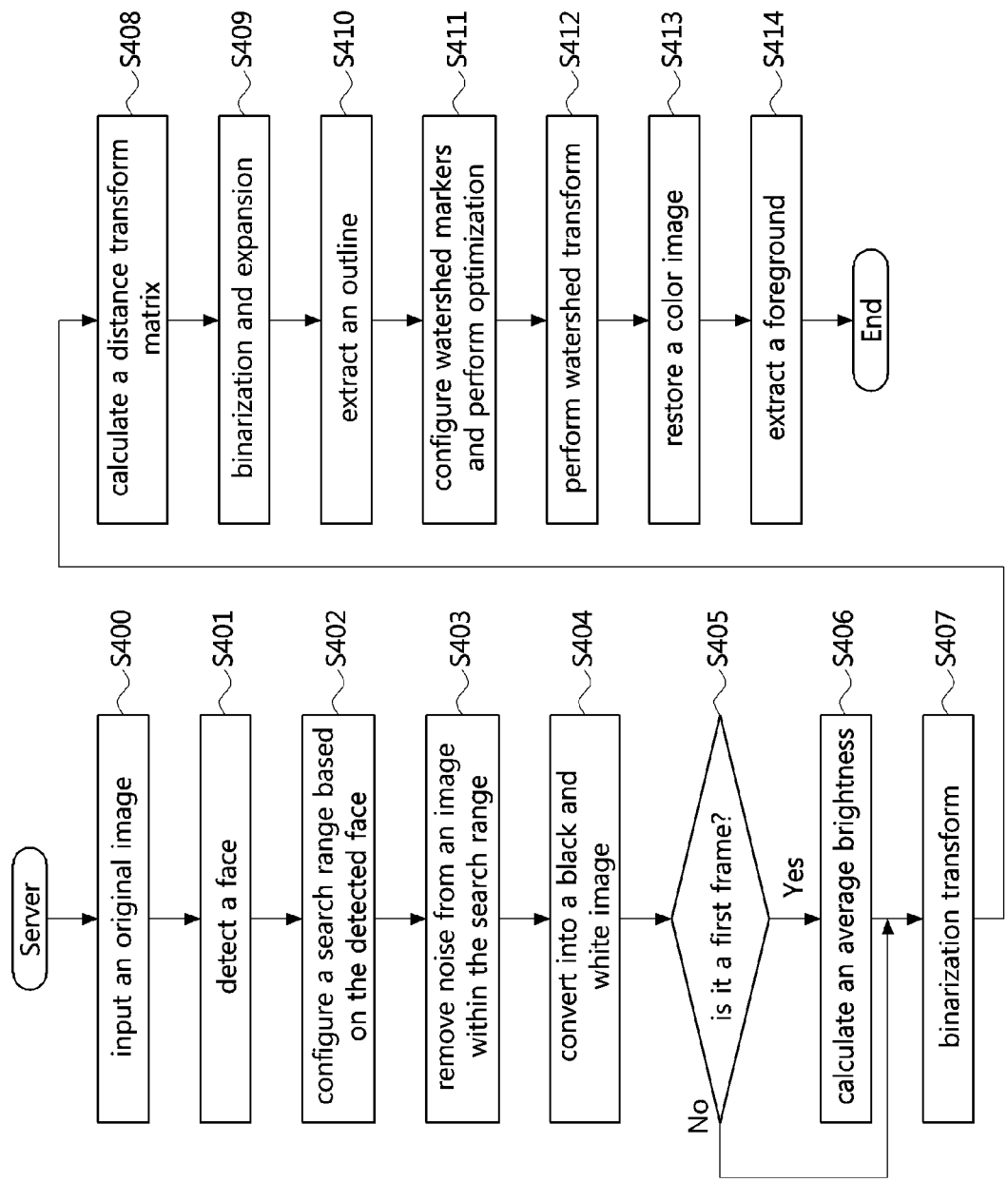
FIG. 4 is a flowchart illustrating a method for extracting a person region according to an exemplary embodiment of the present disclosure.

FIG. 4 is a flowchart illustrating a method for extracting a person region according to an exemplary embodiment of the present disclosure.

All or a part of steps constituting a method for extracting a person region shown in FIG. 4 may be performed by the system or the image processing device mentioned in the above-described exemplary embodiments, but various exemplary embodiments are not limited thereto. In the following description, it is assumed that the entity performing the method is the image processing device.

Referring to FIG. 4, the image processing device may receive a raw image from the image acquisition device (S400), and detect a face of a person (e.g., user) based on the received raw image (S401). Here, the detected information may include the position and size of the face. The image processing device may set a range in which an upper body of the person is to be located, that is, a search range, in consideration of the position and size of the detected face (S402). For example, the search range may be set as including a region twice or three times larger than a rectangular region determined based on the face in consideration of a hairstyle and a torso position relative to the face, and the entire region located below the face. In this way, the processing speed may be improved by limiting the search range.

The image processing device may remove noises of an image within the set search range (S403). For example, a Gaussian blur scheme may be used for the noise reduction. The Gaussian blur scheme is one of the basic image processing schemes and typically provides an effect of reducing image noise or detail.

Then, the image processing device may convert the image within the search range from which the noise is removed to a black and white image for speed improvement and application of a watershed algorithm (S404). Also, although not shown in FIG. 4, a process of converting the image into a lower resolution image may be additionally performed to further save computation time.

On the other hand, the extraction of the person region may be greatly affected by lighting depending on an environment. In this reason, the image processing device according to an exemplary embodiment of the present disclosure may calculate an average brightness value for the first frame in which the extraction of the person region is started (S405) or at a later required time point (S406), and may use the average brightness value for generating a binary image (S407). For example, an average brightness value of the image within the search range may be calculated, and the image may be binarized based on the average brightness value. Alternatively, the image may be binarized based on an arbitrary value close to the average brightness value.

Here, the reason for calculating the average brightness value only for the first frame or the frame at the later time point is that the configuration that calculates the average brightness value every frame may cause a slowdown, may make the average brightness value sensitive to the change in the lighting, and may not generate a result having continuity. In addition, although FIG. 4 illustrates an exemplary embodiment in which the average brightness value calculation is performed only for the first frame, as described above, the average brightness value for the frame may be calculated as necessary or periodically.

Then, the image processing device may calculate a distance transform matrix with respect to the binarized image (S408). This is to use the distance transform matrix when creating markers used for the watershed transform. As described above, the watershed transform based on the distance transform matrix may be helpful to separate rounded objects. Also, the watershed transform has a property of creating continuous outlines as far from centers of the objects as possible, and may be helpful to achieve such the advantage as much as possible.

The image processing device may also perform binarization transform again and apply an image dilation filter to extract outlines using the calculated distance transform matrix in order to improve the quality of the extracted final result (S409). Also, since the person region acquired by the image acquisition device is generally estimated to occupy a region of a certain size or more, in the step S410 of extracting of the outlines, noises or small objects may be removed in advance, leaving only outlines having a predetermined size or more among the several outlines.

The above-described conversion to black and white image (S404), binarization transform (S407), image dilation filter application (S409), and outline extraction (S410) may be performed by the preprocessing module of the image processing device.

The image processing device may configure and optimize information to be used as the markers for the watershed transform on the image preprocessed through the above-described steps (S411). In this case, the markers may be configured for each of the foreground and the background. To obtain a high-quality watershed transform result, marker information about the foreground and background should be generated in advance. Therefore, by performing image dilation and binarization processes based on the outlines calculated through the above-described image preprocessing, the markers to be used as foreground information and the markers to be used as background information may be calculated and optimized.

The image processing device may perform a watershed transform using the configured markers (S412), and use the result of the watershed transform as a mask for extracting the person region from the raw image. In this case, the image processing device may reconstruct the image converted into the black and white image to the color image again (S413), and then calculate and extract a foreground region (i.e., person region) with respect to the restored color image (S414). The extracted foreground may be transmitted to the image display device and displayed by the image display device.

Table 1 below shows experimental results of the method for extracting a person region according to an exemplary embodiment of the present disclosure.

TABLE 1

| Items | Result | Evaluation scheme |
|---|---|---|
| Real-time processing performance | 15 fps | The number of frames displayed per unit time on the display of the mobile device |
| Response latency | 71 ms | Display delay time when extracting a person region as compared to a case of not extracting a person region |

In Table 1, the real-time processing performance is an item for checking whether the processing performance is applicable to the real-time service in the Android environment, and internally, a numerical value obtained by calculating the processing speed per frame was identified. The experimental result shows that the performance is higher than 15 frames per sec (fps).

The response latency item is for checking whether a response latency after the start of shooting is equal to or less than a reference value. In this item, it was checked whether the time required for acquiring an image captured by a camera, processing the first frame, and outputting the result on the screen is less than the reference value. The experimental result for the response latency, that is, the first frame processing time was identified to be 71 ms.

Figure 5:
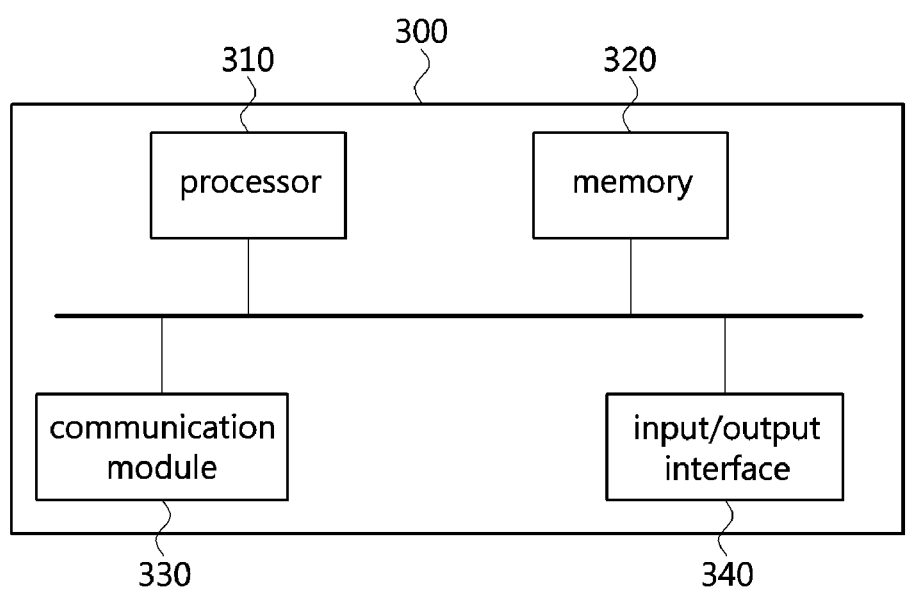
FIG. 5 is a block diagram illustrating an image processing device according to another exemplary embodiment of the present disclosure.

FIG. 5 is a block diagram illustrating an image processing device according to another exemplary embodiment of the present disclosure.

Referring to FIG. 5, an image processing device according to another exemplary embodiment of the present disclosure may comprise a processor 310, a memory 320, a communication module 330, and an input/output interface 340.

The processor 310 may execute operations or data processing related to control and/or communication with respect to at least one component among the memory 320, the communication module 330, and the input/output interface 340.

The memory 320 may include volatile and/or nonvolatile memory, and may store, for example, at least one instruction executed by the processor and a result of executing the at least one instruction.

Here, the at least one instruction may be configured the processor to detect a face from a raw image input in real time; configure a search range based on the detected face; extract an outline of a person region by performing preprocessing on an image within the search range; configure watershed markers on a background and a foreground of the image within the search range based on the extracted outline; perform a watershed transform based on of the configured watershed markers; and separate the person region from the raw image using a result of the watershed transform.

The communication module 330 may establish communication between the image processing device and an external apparatus. For example, the communication module may be connected to a network through wireless or wired communication to communicate with the external apparatus or an external server.

The input/output interface 340 may transmit, for example, a command or data input from a user or another external apparatus to another component of the image processing apparatus, or may transmit a command or data received from other components in the image processing apparatus to the user or another external apparatus.

The method according to the exemplary embodiments of the present disclosure may also be embodied as computer readable programs or codes on a computer readable recording medium. The computer readable recording medium is any data storage device that may store data which can be thereafter read by a computer system. The computer readable recording medium may also be distributed over network coupled computer systems so that the computer readable code is stored and executed in a distributed fashion.

In addition, examples of the computer-readable recording medium may include magnetic media such as hard discs, floppy discs, and magnetic tapes, optical media such as compact disc-read-only memories (CD-ROMs), digital video disc (DVDs), and so on, magneto-optical media such as floptical discs, and hardware devices specially configured (or designed) for storing and executing program commands, such as ROMs, random access memories (RAMs), flash memories, and so on. Examples of a program command may not only include machine language codes, which are created by a compiler, but may also include high-level language codes, which may be executed by a computer using an interpreter, and so on.

Some aspects of the present disclosure have been described in the context of an apparatus but may also represent the corresponding method. Here, a block or the apparatus corresponds to an operation of the method or a characteristic of an operation of the method. Likewise, aspects which have been described in the context of the method may be indicated by the corresponding blocks or items or characteristics of the corresponding apparatus. Some or all of operations of the method may be performed by (or using) a hardware device, such as a microprocessor, a programmable computer, or an electronic circuit. In some embodiments, one or more important steps of the method may be performed by such a device. In the exemplary embodiments of the present disclosure, a programmable logic device (e.g., a field-programmable gate array (FPGA)) may be used to perform some or all of functions of the above-described methods. In the exemplary embodiments, the FPGA may operate in combination with a microprocessor for performing one of the above-described methods. In general, the methods may be performed by any hardware device.

While the exemplary embodiments of the present disclosure and their advantages have been described in detail, it should be understood that various changes, substitutions and alterations may be made herein without departing from the scope of the disclosure.

What is claimed is:

1. A method for extracting a person region, performed by a portable terminal, the method comprising:
   detecting a face from a raw image input in real time;
   configuring a search range based on the detected face;
   extracting an outline of a person region by performing preprocessing on an image within the search range;
   configuring watershed markers on a background and a foreground of the image within the search range based on the extracted outline;
   performing a watershed transform based on the configured watershed markers; and
   separating the person region from the raw image using a result of the watershed transform,
   wherein the extracting of the outline of the person region comprises:
   converting the image within the search range into a black and white image;
   performing a binarization transform on the converted black and white image;
   calculating a distance transform matrix for the binarization-transformed image;
   extracting the outline of the person region using the distance transform matrix;
   applying an image dilation filter based on a result of calculating the distance transform matrix; and
   removing an outline of an object smaller than a predetermined size from the extracted outline.

2. The method according to claim 1, wherein the separating of the person region comprises separating the person region from the image within the search range by using the result of the watershed transform as a mask.

3. The method according to claim 1, wherein the raw image is input from an image acquisition device, and the image acquisition device is a front camera of the portable terminal.

4. The method according to claim 1, further comprising displaying the separated person region.

5. An apparatus for extracting a person region from an input image, the apparatus comprising a processor and a memory storing at least one instruction executable by the processor,
   wherein when executed by the processor, the at least one instruction is configured to:
   detect a face from a raw image input in real time;
   configure a search range based on the detected face;
   extract an outline of a person region by performing preprocessing on an image within the search range;
   configure watershed markers on a background and a foreground of the image within the search range based on the extracted outline;
   perform a watershed transform based on the configured watershed markers;
   separate the person region from the raw image using a result of the watershed transform;
   convert the image within the search range into a black and white image;
   perform a binarization transform on the converted black and white image;
   calculate a distance transform matrix for the binarization-transformed image;
   extract the outline of the person region using the distance transform matrix;
   apply an image dilation filter based on a result of calculating the distance transform matrix; and
   remove an outline of an object smaller than a predetermined size from the extracted outline.

6. The apparatus according to claim 5, wherein the at least one instruction is further configured to separate the person region from the image within the search range by using the result of the watershed transform as a mask.

7. The apparatus according to claim 5, wherein the raw image is input from an image acquisition device, and the image acquisition device is a front camera of the portable terminal.

8. The apparatus according to claim 5, wherein the at least one instruction is further configured to display the separated person region.

9. A system for extracting a person region, the system comprising:
   an image acquisition device acquiring a raw image in real time, the raw image including a target person and a background;
   an image processing device:
   detecting a face from the raw image input from the image acquisition device in real time;
   configuring a search range based on the detected face;
   extracting an outline of a person region of the target person by performing preprocessing on an image within the search range;
   configuring watershed markers on a background and a foreground of the image within the search range based on the extracted outline;
   performing a watershed transform based on the configured watershed markers; and
   separating the person region from the raw image using a result of the watershed transform; and
   an image display device displaying the separated person region,
   wherein the image processing device further:
   converts the image within the search range into a black and white image;
   performs a binarization transform on the converted black and white image;
   calculates a distance transform matrix for the binarization-transformed image;
   extracts the outline of the person region using the distance transform matrix;
   applies an image dilation filter based on a result of calculating the distance transform matrix; and
   removes an outline of an object smaller than a predetermined size from the extracted outline.

10. The system according to claim 9, wherein the image processing device separates the person region from the image within the search range by using the result of the watershed transform as a mask.

11. The system according to claim 9, wherein the image acquisition device is a front camera of the portable terminal.

12. The system according to claim 9, wherein the image display device displays the separated person region and a background region different from the background of the raw image.

* * * * *